(12) United States Patent
Lee

(10) Patent No.: US 6,948,721 B2
(45) Date of Patent: Sep. 27, 2005

(54) VARIABLE LEVELING VALVE APPARATUS FOR A VEHICLE

(75) Inventor: Yong-Soo Lee, Chonrabuk-Do (KR)

(73) Assignee: Hyundai Motor Company, Seoul (KR)

( * ) Notice: Subject to any disclaimer, the term of this patent is extended or adjusted under 35 U.S.C. 154(b) by 189 days.

(21) Appl. No.: 10/319,007

(22) Filed: Dec. 13, 2002

(65) Prior Publication Data
US 2003/0111807 A1 Jun. 19, 2003

(30) Foreign Application Priority Data
Dec. 14, 2001 (KR) .......................................... 2001-79383

(51) Int. Cl.⁷ .............................................. B60G 17/00
(52) U.S. Cl. ............................... 280/5.514; 280/6.159; 267/64.16
(58) Field of Search ............................. 280/5.514, 6.15, 280/6.157, 6.159, 124.16, 683; 267/64.16; 137/596

(56) References Cited

U.S. PATENT DOCUMENTS

| | | | | |
|---|---|---|---|---|
| 2,970,614 A | * | 2/1961 | Christensen | 137/627.5 |
| 3,036,596 A | * | 5/1962 | Giuseppe | 137/636.1 |
| 3,352,565 A | * | 11/1967 | Reynolds | 180/9.1 |
| 3,480,293 A | * | 11/1969 | Fultz et al. | 180/41 |
| 3,559,688 A | | 2/1971 | Fischer et al. | |
| 3,635,460 A | * | 1/1972 | Shilton et al. | 267/64.16 |
| 3,691,336 A | * | 9/1972 | Higginbotham | 200/288 |
| 4,077,617 A | | 3/1978 | Wright | |
| 4,091,738 A | | 5/1978 | Platner | |
| 4,433,872 A | | 2/1984 | Parker et al. | |
| 4,673,172 A | * | 6/1987 | Blanz | 267/64.11 |
| 4,886,092 A | | 12/1989 | Barzelay | |
| 5,161,579 A | | 11/1992 | Anderson, Jr. | |
| 5,161,817 A | | 11/1992 | Daum et al. | |
| 5,203,375 A | | 4/1993 | Blanz | |
| 5,220,982 A | | 6/1993 | Anderson, Jr. | |
| 5,560,591 A | | 10/1996 | Trudeau et al. | |
| 5,651,555 A | | 7/1997 | O'Reilly et al. | |
| 5,678,847 A | * | 10/1997 | Izawa et al. | 280/5.515 |
| 5,730,428 A | | 3/1998 | Sulzyc | |
| 5,820,112 A | | 10/1998 | Kim | |
| 5,871,217 A | | 2/1999 | Blanz | |
| 5,934,320 A | | 8/1999 | O'Reilly et al. | |
| 6,203,026 B1 | * | 3/2001 | Jones | 280/6.151 |
| 6,308,793 B1 | | 10/2001 | Eberling | |
| 6,412,790 B2 | * | 7/2002 | McKenzie et al. | 280/6.159 |

FOREIGN PATENT DOCUMENTS

| | | |
|---|---|---|
| DE | 199 23 456 C1 | 5/1999 |
| EP | 0 487 928 | 3/1995 |
| EP | 0 520 147 | 7/1995 |
| EP | 0 517 550 | 5/1997 |
| EP | 0 792 762 | 8/1998 |
| EP | 0 827 850 | 5/2000 |

* cited by examiner

Primary Examiner—Paul N. Dickson
Assistant Examiner—Laura B. Rosenberg
(74) Attorney, Agent, or Firm—Morgan Lewis & Bockius LLP

(57) ABSTRACT

The invention is disclosed to variably control the amount of compressed air flowing per unit hour depending on the change in the level position of the wheel axles in a moving vehicle when the compressed air flows into air springs from the leveling valve or when the compressed air flows out of the air springs through the leveling valve, so as to make it possible to variably control the time to restore the status of the vehicle body depending on the level of rollings caused when the vehicle turns a corner, thereby achieving turning stability, higher response speed and steering.

5 Claims, 7 Drawing Sheets

VARIABLE LEVELING VALVE APPARATUS FOR A VEHICLE

FIELD OF THE INVENTION

Generally, the present invention relates to suspension for a vehicle. More particularly, the present invention relates to a variable leveling valve for suspension of a vehicle for variably controlling the flow of compressed air in and out of air springs according to changes in the position of a vehicle in motion.

BACKGROUND OF THE INVENTION

In general, an air suspension unit mounted on a vehicle has a leveling valve that controls the supply and exhaust of compressed air through an air spring. Such air springs are typically installed between a vehicle axle and a vehicle body. The air springs respond according to changes in the level position of a moving vehicle. Common leveling valves can be classified as either a rotary type or a plunger type according to the operational method thereof.

A conventional plunger type valve includes a flow path that passes in a vertical direction between an inlet and an outlet. Compressed air is let in and out and transferred between left and right air springs by a plunger that moves caps, thereby opening different passageways. The plunger is moved in response to a lever that is typically connected between the axle and the vehicle body.

In use, when the axles move up, the rising rotation of the lever turns a rotor, which correspondingly lifts up the plunger. As the plunger is raised, the lower cap opens the flow path to communicate with the connecting path.

As a result, the high pressure of compressed air pushes the upper cap down and the air flows into the flow path through the inlet. The compressed air is then supplied to the left and right air springs through a lower cap and a connecting path.

When the axles move down, the rotor is turned with the falling rotation of the lever. Rotation of the rotor lowers the plunger. The falling movement of the plunger causes the lower cap to block the flow path via the restoration force of the return spring, thereby disconnecting the communication with the inlet.

In the leveling valve design, the inlet and the outlet open or close according to the rotational angle of the lever when the wheel axles move up or down. There is only a constant change in the flow amount of compressed air per hour depending on the change in the rotational angle of the lever so that the time taken for compressed air to flow in and out of the air springs cannot be adjusted according to the degree of change in the level position of a moving vehicle.

There are drawbacks in the related art. In the related art designs, vehicle rolling is not restrained within a short time interval. Therefore, the turning stability and the response speed of a vehicle are negatively affected.

SUMMARY OF THE INVENTION

The present invention provides a variable leveling valve apparatus for suspension of a vehicle. The variable leveling valve apparatus controls the flow amount of compressed air per unit hour flowing into air springs from a leveling valve. The flow depends on the degree of change in the level position of a moving vehicle, thereby achieving an optimal turning stability by variably controlling the time needed for the vehicle body to restore its status. The time for restoration depends on the degree of rolling of the vehicle. Furthermore, the time for restoration improves the steering feel by increasing the response speed.

In one embodiment of the present invention, a variable leveling valve apparatus for a vehicle comprises a flow path for connecting an inlet and outlet through which compressed air flows to a housing, and a connecting path branched from the flow path and connected to left/right air springs. A flow amount control means is installed in the flow path for respectively controlling the amount of compressed air per unit hour flowing into the flow path through the inlet and the amount of compressed air per unit hour discharging outside through the connecting path and the outlet. A plunger is movably installed in the flow path for operating the flow amount control means. A rotor is provided to move the plunger in a straight direction. A lever is coupled at one end to the rotor for rotating the rotor according to a change in distance between the vehicle axle and vehicle body.

BRIEF DESCRIPTION OF THE DRAWINGS

The features and advantages of the present invention will be better understood by reference to the following detailed description, which should be read in conjunction with the accompanying drawings in which.

DETAILED DESCRIPTION OF THE INVENTION

Hereinafter, an embodiment of the present invention will be described in detail with reference to the accompanying drawings.

Figure 1:
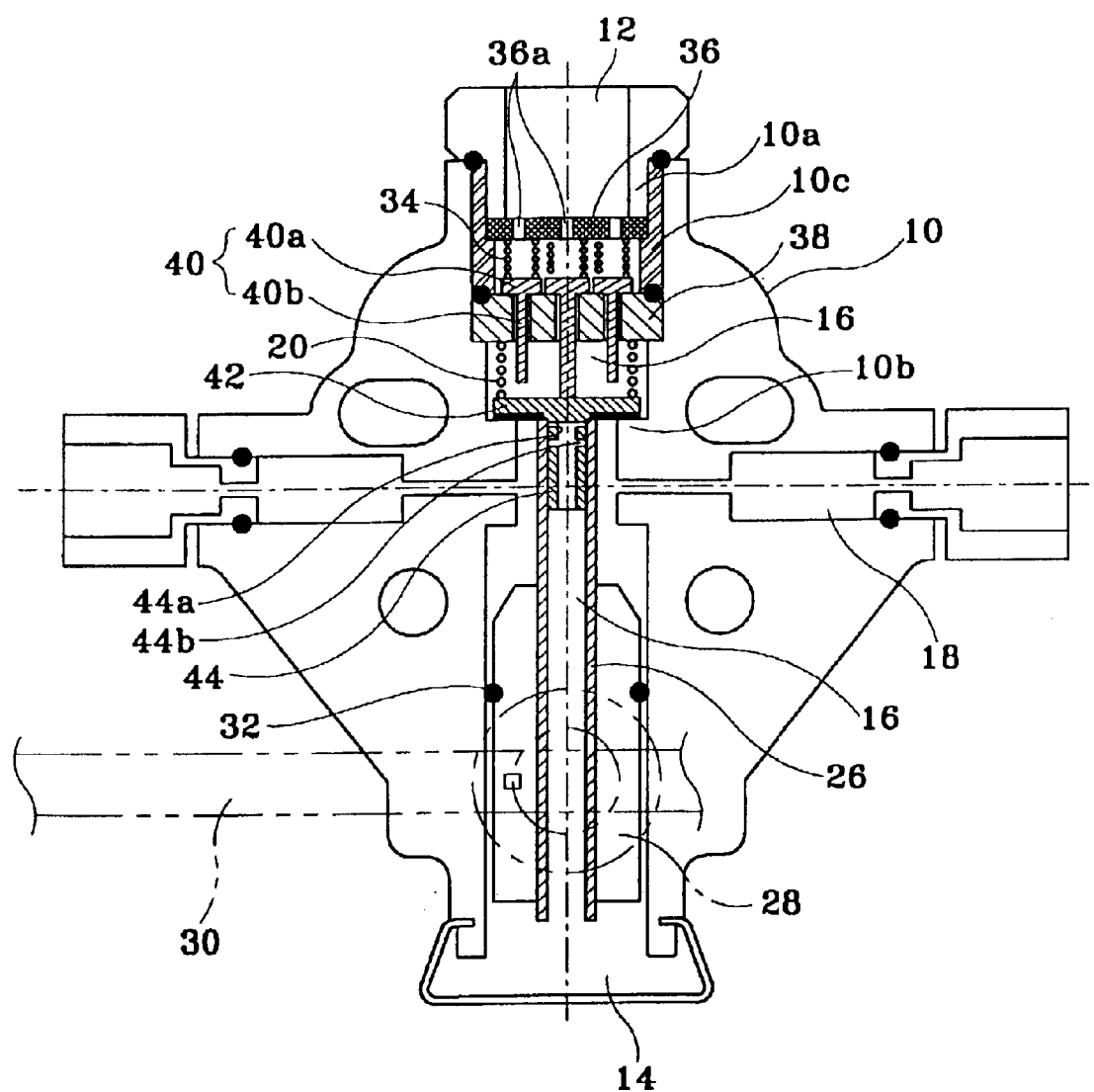
FIG. 1 is a cross-sectional view illustrating the structure of a leveling valve in accordance with the present invention.
Figure 2:
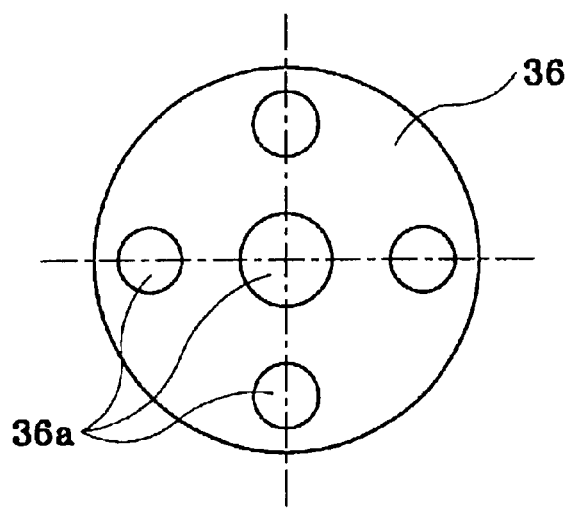
FIG. 2 is a front view of a first fixing plate shown in FIG. 1
Figure 3:
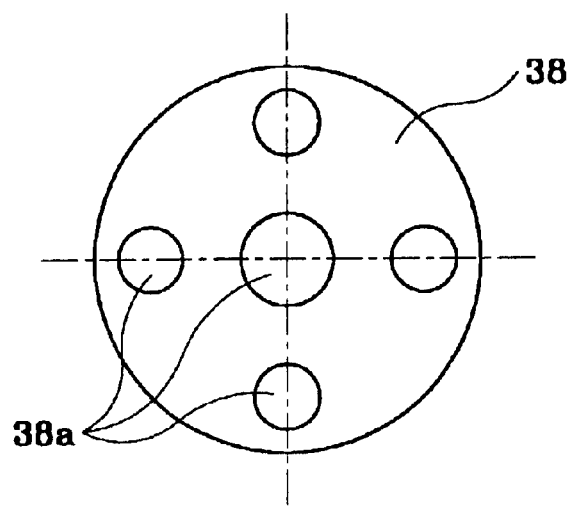
FIG. 3 is a front view of a second fixing plate shown in FIG. 1

FIG. 1 shows an embodiment of the present invention in which a variable leveling valve apparatus for a vehicle comprises a flow path 16 vertically formed to connect an inlet 12. Inlet 12 flows in, and an outlet 14, flows out compressed air inside a predetermined shape of a housing 10. A connecting path 18 is respectively branched from the center portion of the flow path 16 to the the sides for communicating with left and right air springs (not shown). Also included is a flow amount control means for respectively controlling the amount of compressed air per unit hour flowing into the flow path 16 through the inlet 12 and the amount of compressed air per unit hour flowing out through the connecting path 18 and the outlet 14. A plunger 26, installed in the lower portion of the flow path 16, operates the flow amount control means and a rotor 28 rotatably coupled to the lower end of the plunger 26 to vertically move the plunger 26. Furthermore, there is a lever 30 with one end thereof coupled to the rotor 28 to be rotated according to the change in distance between the vehicle axle and the vehicle body, thereby controlling the supply and discharge of compressed air into the air springs.

The flow amount control means includes: a first fixing plate 36 installed at the housing 10 with a plurality of first through holes 36a for passing compressed air flown from the inlet 12; a second fixing plate 38 installed to face the first fixing plate 36 with a plurality of second through holes 38a; a plurality of valve members 40 having a head portion 40a to block the plurality of second through holes 38a and a leg portion 40b slidingly inserted in the second through holes 38a, the head part 40a being arranged to face the first fixing plate 36; a plurality of auxiliary return springs 34 for elastically supporting the head portion 40a in a closed or blocked position with respect to the second through holes 38a; a valve member opening/closing means for pushing the leg portion 40b of the plurality of valve members with a straight moving force transmitted from the plunger 26 to make the head portion 40a sequentially open the second through holes 38a and switch the communication status of the flow path 16 and the connecting path 18; and a flow-out amount control means for varying the communicating area between the flow path 16 and the connecting path 18 according to the straight moving force of the plunger 26.

The first fixing plate 36 supports the auxiliary return springs 34 elastically supporting the head portion 40a of the plurality of valve members toward the direction of blocking the second through holes 38a and also to allow compressed air flowed from the inlet 12 to be supplied to the second through holes 38a.

In an alternate embodiment, a steel net with a plurality of holes arranged therein may be used instead of the first fixing plate 36.

The valve member opening and closing means includes: a leg portion 40b formed with different lengths thereof at a plurality of valve members 40; an operating plate 42 installed to be contacted substantially flatly by the leg portion 40b for moving linearly with the pressure applied by the plunger 26; a cross-section reducing portion 10b formed at the flow path 18 for blocking the communicating status between the inlet 12 and the connecting path 18 in order for the operating plate 42 to be tightly contacted in the direction against the pressure supplied by the plunger 26; and a return spring 20 for elastically supporting the operating plate 42 toward the cross-section reducing portion 10b.

To selectively open the plurality of valve members 40 accordingly with the linear movement of the operating plate 42, the length of the leg portion 40b of the valve members vary. Thus, the leg portion 40b of the valve members are sequentially pushed resulting in a sequential opening of the second through holes 38a.

The operating plate 42 is also supported by the return spring 20 against the direction of movement of the plunger 26. In use, if the plunger 26 is lowered by a corresponding rotation of the rotor 28 and, therfore does not apply pressure to the operating plate 42, the return spring 20 pushes the operating plate 42 to the cross-section reducing portion 10b to block the compressed air flowing from the inlet 12 from proceeding any further.

The flow-out amount control means includes: a hollow-pipe-shaped inserting part 44 protruding toward the plunger 26 at the operating plate 42; a plunger 26 is formed with a hollow portion into which the inserting part 44 is slidingly inserted and through which the flow path is connected to the outlet; and a plurality of connecting holes (first and second connecting holes 44a, 44b in the embodiment of the present invention) formed at the inserting part 44 for changing the total cross-section area for communication between the outlet 14 and the flow path 16 depending on the insertion level of the inserting part 44 and the plunger 26.

In use, the first and second connecting holes 44a and 44b of the inserting part are sequentially opened according to the position of the plunger 26 with respect to the inserting part 44. As the plunger 26 is lowered by the rotor 28, the communication area between the flow path 16 and the outlet 14 changes.

A separate sealing member 32 is mounted at the lower side of the plunger 26 for guiding the plunger 26.

Figure 4:
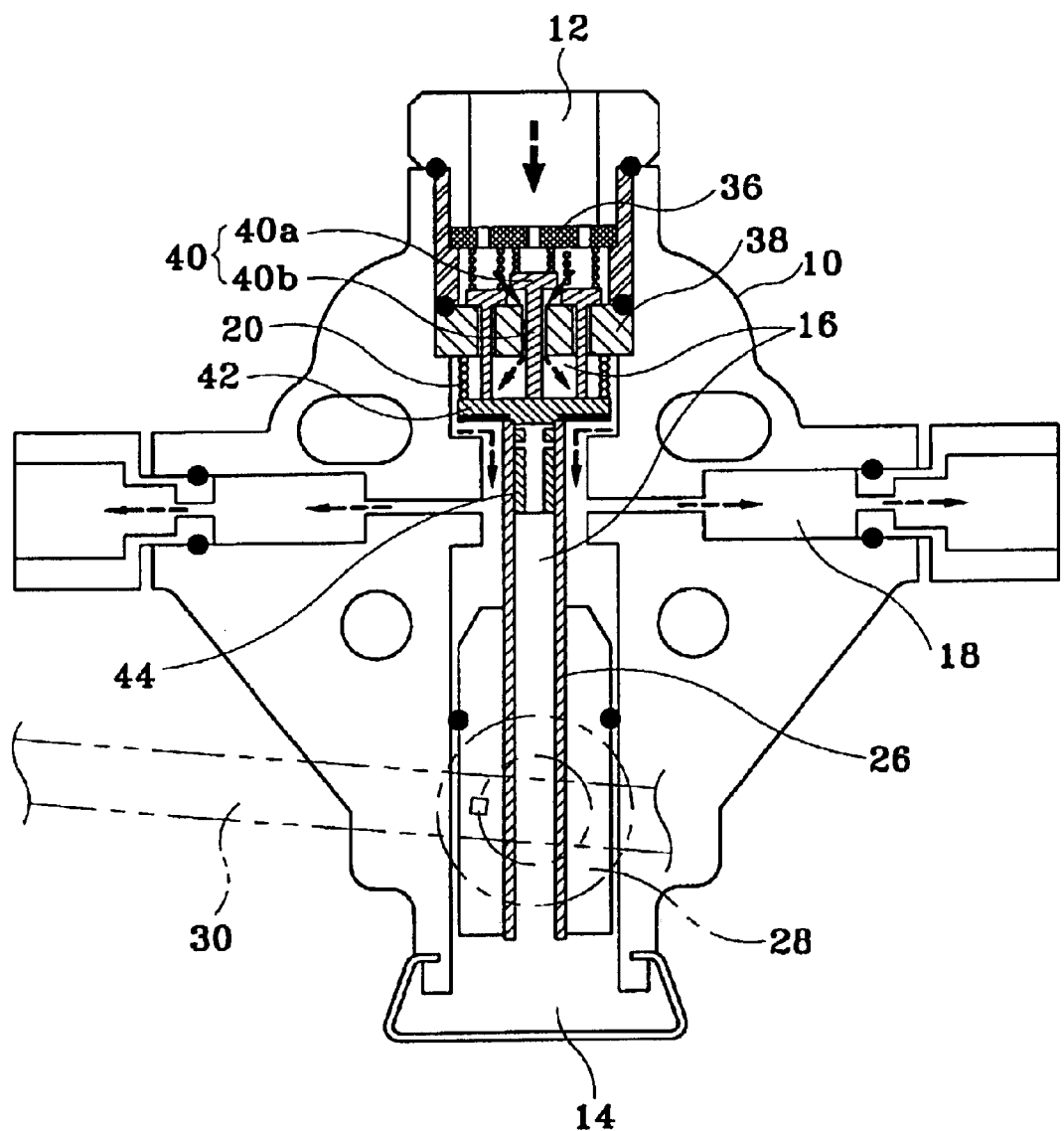
FIG. 4 is a cross-sectional view illustrating an operational state of the leveling valve shown in FIG. 1 when the wheel axles move up and a small rolling occurs.

Therefore, when the wheel axles move up slightly, as represented in FIG. 4, the rotor 28 turns according to the rising rotation of the lever 30 and the plunger 26 raises accordingly. As the plunger 26 rises, the operating plate 42 is raised away from the cross-section reducing portion 10b. Initially only the valve member 40 having the longest leg portion 40b among all the valve members 40 are raised or lifted. As a result, the inlet 12 comes into fluid communication with the flow path 16 through the open second through holes 38a.

Thus, the compressed air that passes through the inlet 12, passes through the first through holes 36a of the first fixing plate 36, through the open second through holes 38a, the open operating plate 42, and into the flow path 16. The compressed air is then supplied through the connecting path 18 to the left and right air springs.

Figure 5:
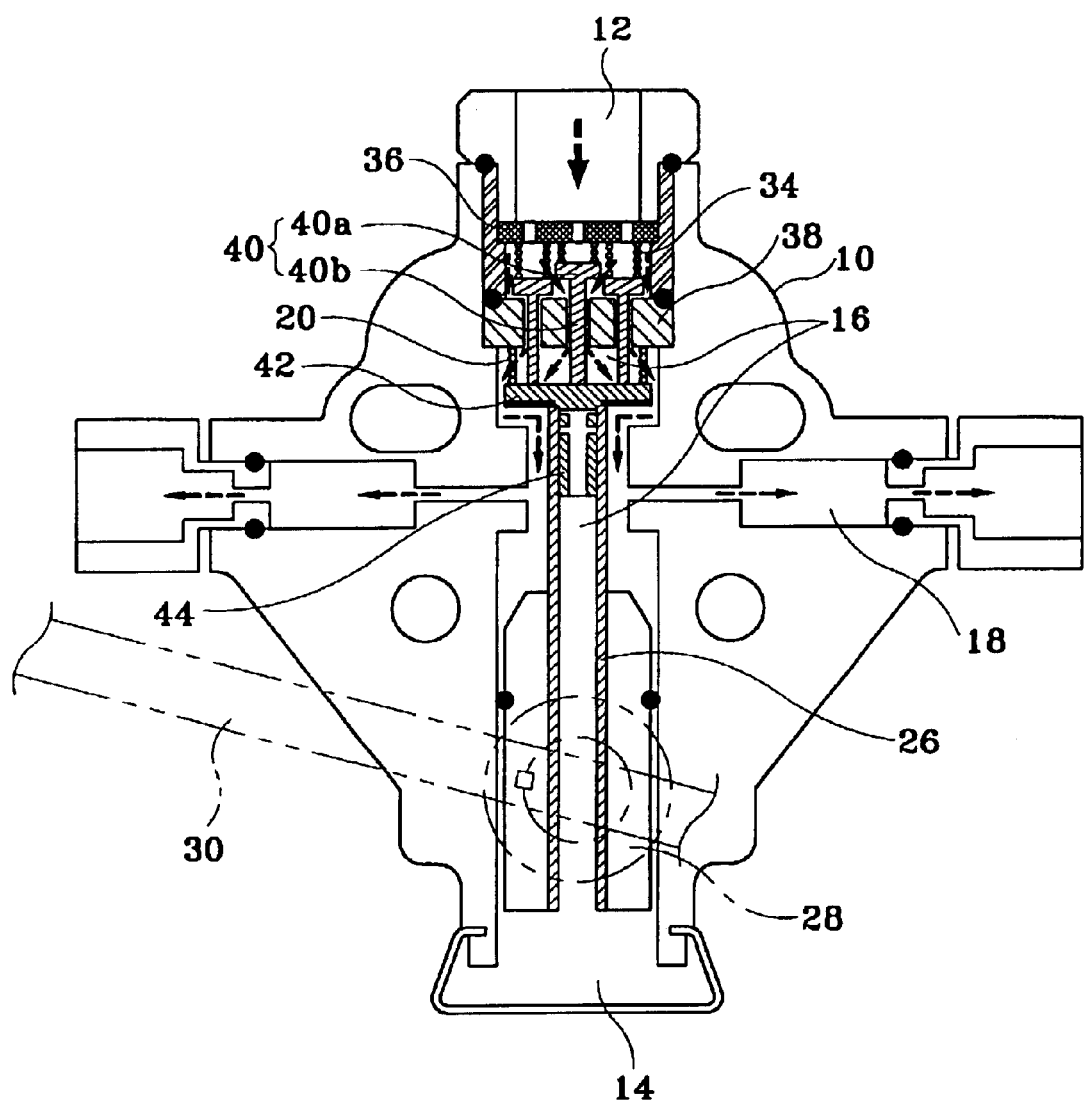
FIG. 5 is a cross-sectional view illustrating an operational state of the leveling valve shown in FIG. 1 when the wheel axles move up and a big rolling occurs.

When the axles of the vehicle move up an extreme distance, as represented in FIG. 5 by displacement of the lever 30, the rotor 28 is turned, which greatly increases the rising of the plunger 26. With enough rise of the plunger 26 all of the plurality of valve members 40 inserted into the second through holes 38a of the second fixing plate 38 are raised. The operating plate 42 is also raised with the rise of the plunger 26. Therefore, the inlet 12 is in fluid communication with the flow path 16 through all of the open second through holes 38a.

As a result, the compressed air that passes through the first through holes 36a of the first fixing plate 36 and through the inlet 12 flows through all of the open second through holes 38a of the second fixing plate 38 and the open state of the operating plate 42 into the flow path 16. The compressed air is then supplied through the connecting path 18 to the left/right air springs.

At this time, the amount of flow of compressed air per unit hour supplied to the air springs is greatly increased. This results in a reduction in the time needed to restore the tilted state of the vehicle.

Figure 6:
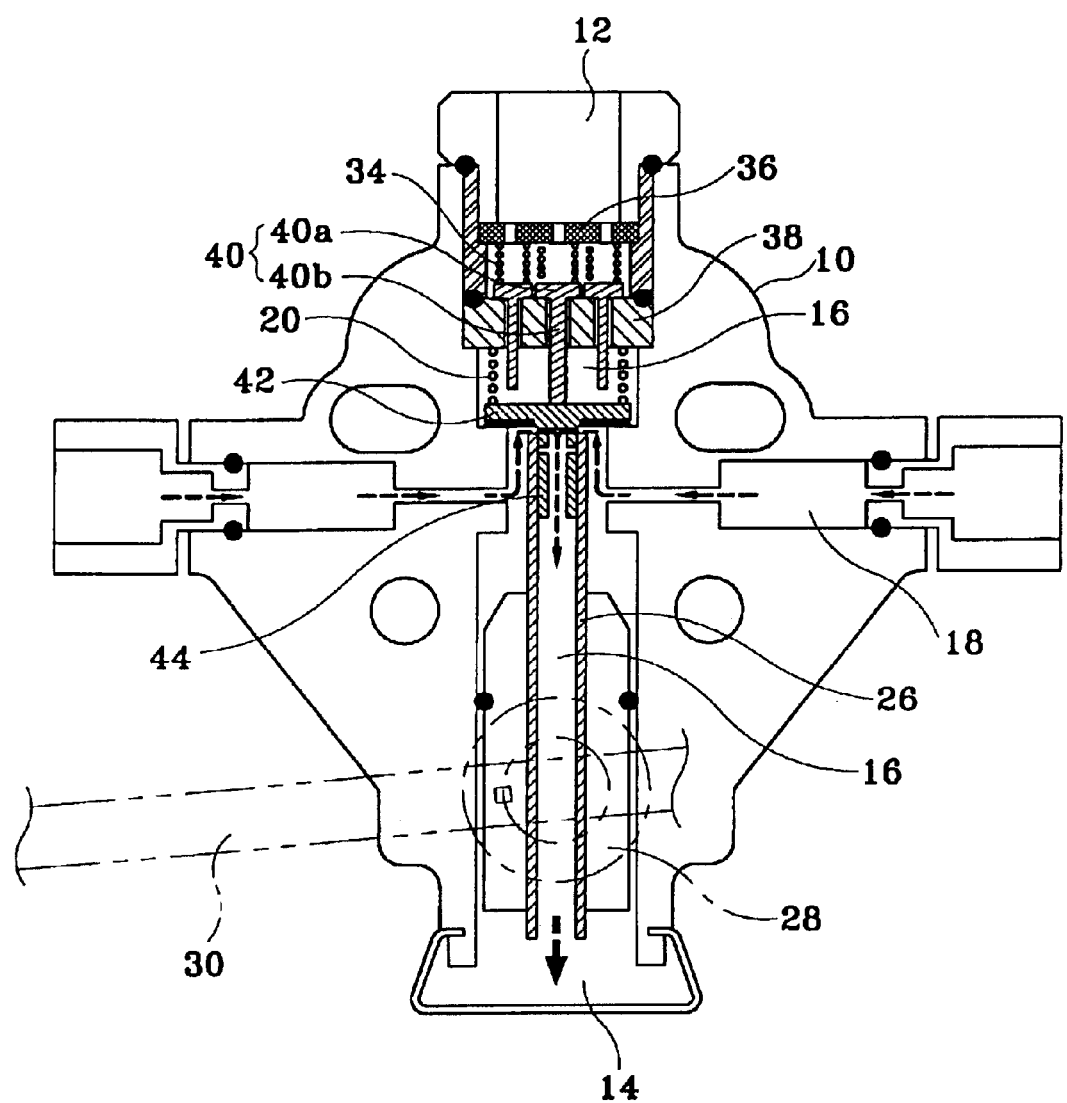
FIG. 6 is a cross-sectional view illustrating an operational state of the leveling valve shown in FIG. 1 when the wheel axles move down and a small rolling occurs.

When the wheel axles move down slightly, as represented in FIG. 6, the rotor 28 rotates according to the falling rotation of the lever 30, the rotor 28 rotates accordingly thereby moving the plunger 26. At the fall of the plunger 26, the operating plate 42 closes against the cross-section reducing portion 10b by the restoration force of the return spring 20. As a result, the flow path 16 is closed, blocking the communicative state with the inlet 12. Accordingly, the operating plate 42 moves apart from the plunger 26. This opens the first connecting holes 44a at the uppermost part of the inserting part 44 inserted in the plunger 26 for fluid communication with the flow path 16.

As a result, the high pressure of compressed air in the inlet 12 is blocked from flowing inwards by the valve members 40 and the operating plate 42. Instead, the compressed air filled in the air springs flows back to the connecting path 18 and into the flow path 16. The compressed air flown into the flow path 16 flows through a gap between the first connecting holes 44a, formed at the inserting part 44 and the plunger 26, and into the plunger 26 for discharge through the outlet 14 to the outside.

Figure 7:
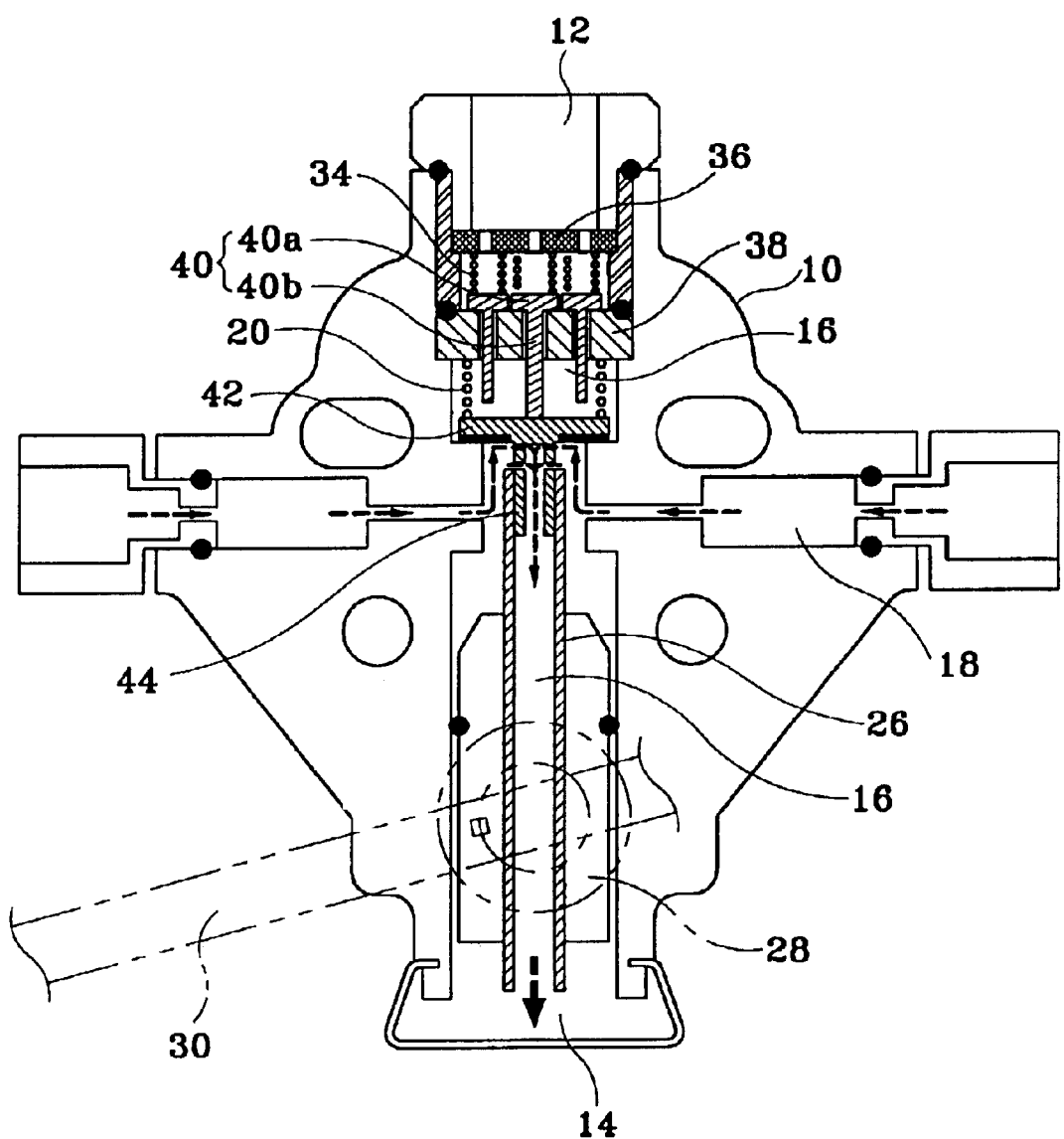
FIG. 7 is a cross-sectional view illustrating an operational state of the leveling valve shown in FIG. 1 when the wheel axles move down and a big rolling occurs.

In another example, when the wheel axles move down an extreme distance, as represented in FIG. 7, the rotor 28 rotates according to the movement of the lever 30. This further lowers the plunger 26. At the fall of the plunger 26, the first and second connecting holes 44a, 44b formed at the inserting part 44 of the operating plate 42 are all opened to communicate with the flow path 16.

With both the first and second connecting holes 44a and 44b open, the compressed air previously flowed into the flow path 16 through the connecting path 18 from the air springs rapidly flows into the plunger 26 through the gap between the first and second connecting holes 44a, 44b. The air then enters the plunger 26 to be discharged outside through the outlet 14.

The flow amount of compressed air flowing outside per unit hour through the connecting path 18, the first and second connecting holes 44a, 44b, and the outlet 14 is greater than when only the first connecting holes 44a are opened, thereby making it possible to reduce the time to restore the tilted state of the vehicle.

Figure 8:
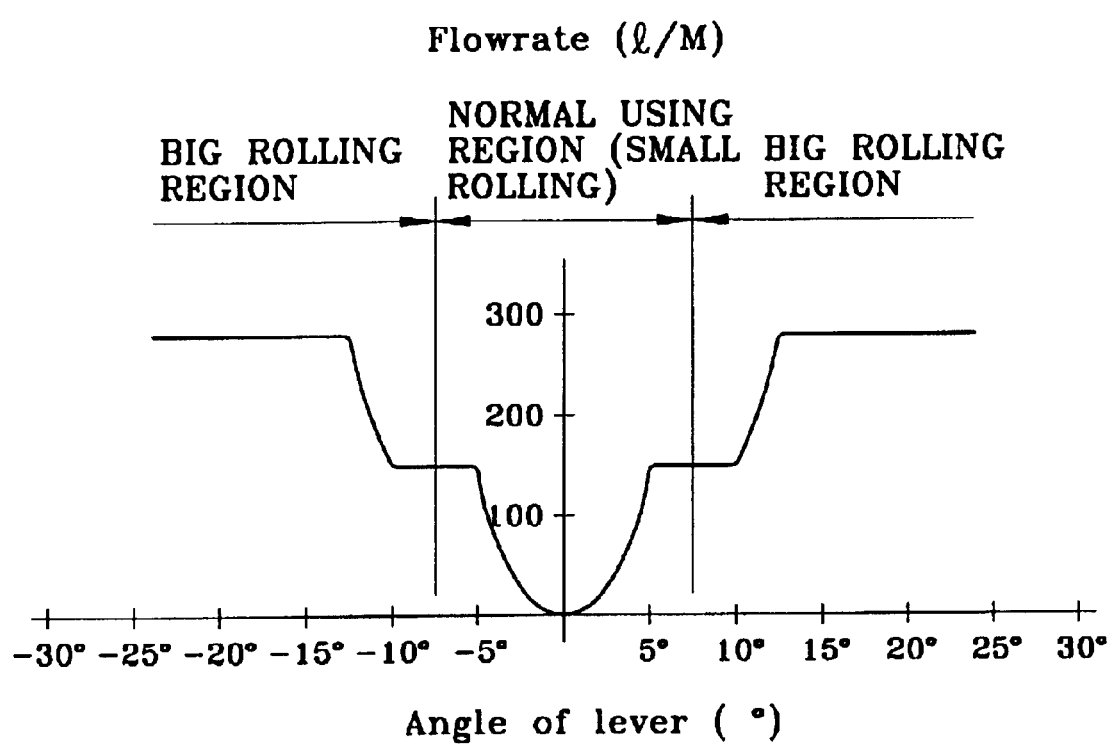
FIG. 8 is a graph for illustrating changes in the flow rate of compressed air according to angular changes of a lever in the leveling valve of the present invention.

FIG. 8 graphically displays the amount of compressed air flowing per unit hour according to changes in the rotational angle of the lever 30 can be variably changed, thereby making it possible to control the restoration speed of the rolling of a vehicle, achieve stability in the turning, and improve response speed.

Also, if the number of valve members 40, the size of the second through holes 38a, or the number or size of the first and second through holes 44a or 44b are adjusted, the amount of compressed air flowing per unit hour can be changed.

The foregoing descriptions of the specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents

What is claimed is:

1. A variable leveling valve apparatus for a vehicle, comprising:
    a housing defining an inlet and an outlet connected by a flow path through which compressed air flows into and out of said housing;
    a connecting path defined by said housing and branched from the flow path and configured for connecting left and right air springs;
    a flow amount control means installed at the flow path for respectively controlling the amount of compressed air per unit hour flowing into the flow path through the inlet and the amount of compressed air per unit hour flowing outside through the connecting path to the outlet;
    a plunger linearly moveable to operate the flow amount control means wherein said plunger is linearly moveable and housed in the flow path;
    a rotor configured to linearly move said plunger; and
    a lever with one end coupled to said rotor for rotatably moving said rotor in response to a change in distance between a vehicle axle and a vehicle body, wherein the flow amount control means comprises:
    a first fixing plate defining a plurality of first through holes for passing compressed air flown from the inlet wherein said first fixing plate is located within said housing;
    a second fixing plate configured to face said first fixing plate wherein said second fixing plate defines a plurality of second through holes;
    a plurality of valve members, each having a head portion to block the plurality of second through holes and a leg portion slidingly inserted into the second through holes wherein the head portion is arranged to face the first fixing plate;
    a plurality of auxiliary return springs for elastically supporting the head portion to block the second throwholes;
    a valve member opening and closing means for pushing the leg portion of the plurality of valve members with a linear moving force transmitted from the plunger to make the head portion sequentially open the second through holes and switch the communication status of the flow path and the connecting path; and
    a flow-out amount control means for varying the communication between the flow path and the connecting path according to the linearly movable force of the plunger.

2. The apparatus as defined in claim 1, wherein the valve member opening and closing means comprises:
    leg portions formed with different lengths thereof at the plurality of valve members;
    an operating plate flatly contacting the leg portions for linear movement with the pressure applied by the plunger;
    a cross-section reducing portion within the flow path for blocking the connecting status between the inlet and the connecting path in order for the operating plate to be tightly contacted in the direction against the pressure supplied by the plunger; and
    a return spring for elastically supporting the operating plate toward the cross-section reducing portion.

3. The apparatus as defined in claim 2, wherein the flow-out amount control means comprises:
    a hollow-pipe-shaped inserting part protruding toward the plunger at the operating plate;
    a hollow portion of said plunger into which the inserting part is slidingly inserted, through which the flow path is connected to the outlet; and
    a plurality of connecting holes formed at the inserting part for changing the total cross-section area for connecting the outlet and the flow path depending on the insertion level of the inserting part and the plunger.

4. A variable leveling valve apparatus for a vehicle, comprising:
    a first fixing plate defining first through holes therethrough configured for passage of inlet air;
    plurality of valves, each configured with a head portion and a leg portion;
    a second fixing plate defining holes therethrough configured for receiving said leg portions of said valves wherein said holes are larger in diameter than said leg portions of said valves and wherein said head portions of said valves seat within said holes thereby closing said holes;

springs disposed between said first fixing plate and said head portions of said valves for supporting said valves in a closed position;

a plunger configured for linear displacement;

an operating plate disposed between said plunger and said leg portions of said valves wherein said operating plate is configured for linear displacement in response to linear displacement of said plunger;

a rotor configured to linearly displace said plunger; and a lever configured for actuation said rotor in response to movement between an axle and a vehicle.

5. The variable leveling valve apparatus of claim 4, wherein said leg portions of said valves are of variable lengths.

* * * * *